(12) United States Patent
Camargo et al.

(10) Patent No.: US 11,525,935 B1
(45) Date of Patent: *Dec. 13, 2022

(54) DETERMINING HYDROGEN SULFIDE (H2S) CONCENTRATION AND DISTRIBUTION IN CARBONATE RESERVOIRS USING GEOMECHANICAL PROPERTIES

(71) Applicant: Saudi Arabian Oil Company, Dhahran (SA)

(72) Inventors: Otto Meza Camargo, Dhahran (SA); Weihua Wang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/463,153

(22) Filed: Aug. 31, 2021

(51) Int. Cl.
*G01V 1/30* (2006.01)
*E21B 43/26* (2006.01)

(52) U.S. Cl.
CPC ............ *G01V 1/30* (2013.01); *E21B 43/26* (2013.01); *G01V 1/306* (2013.01); *G01V 2210/66* (2013.01)

(58) Field of Classification Search
USPC .......................................................... 702/11
See application file for complete search history.

(56) References Cited

U.S. PATENT DOCUMENTS

| | | | |
|---|---|---|---|
| 6,705,398 B2 | 3/2004 | Weng | |
| 7,025,138 B2 | 4/2006 | Kurkjian et al. | |
| 7,042,802 B2 | 5/2006 | Sinha | |
| 7,337,660 B2 | 3/2008 | Ibrahim et al. | |
| 7,457,194 B2 | 11/2008 | Prioul et al. | |
| 7,562,278 B2 | 7/2009 | Lyakh et al. | |
| 7,565,278 B2 | 7/2009 | Li et al. | |
| 7,679,993 B2 | 3/2010 | Sayers | |
| 7,707,018 B2 | 4/2010 | Shaw | |
| 7,941,307 B2 | 5/2011 | Symington et al. | |

(Continued)

FOREIGN PATENT DOCUMENTS

| | | |
|---|---|---|
| AU | 2013374225 B2 | 7/2014 |
| AU | 2018267575 B9 | 12/2018 |

(Continued)

OTHER PUBLICATIONS

Aksenov, A.A. et al.; "Prediction of Distribution of Hydrogen Sulfide in Oil-Gas Basins" Petroleum Geology: A digest of Russian literature on Petroleum Geology; vol. 16 (1979), No. 10 (Oct.); pp. 439-441.

(Continued)

*Primary Examiner* — Paul D Lee
(74) *Attorney, Agent, or Firm* — Bracewell LLP; Constance G. Rhebergen; Brian H. Tompkins

(57) ABSTRACT

Systems, methods, and computer readable media for the determination of hydrogen sulfide ($H_2S$) concentration and distribution in carbonate reservoirs using a mechanical earth model. Hydrogen sulfide (H2S) concentration in a carbonate reservoir n may be measured and correlated with horizontal maximum stresses of stress ratios determined using mechanical earth model for a strike-slip fault regime. The hydrogen sulfide (H2S) concentration at different depths in the carbonate reservoir may be determined using the correlation.

20 Claims, 6 Drawing Sheets
(5 of 6 Drawing Sheet(s) Filed in Color)

(56) References Cited

U.S. PATENT DOCUMENTS

| | | |
|---|---|---|
| 3,024,124 A1 | 9/2011 | Sayers |
| 8,078,405 B2 | 12/2011 | Delorme |
| 8,204,727 B2 | 6/2012 | Dean et al. |
| 8,301,427 B2 | 10/2012 | Souche et al. |
| 8,374,836 B2 | 2/2013 | Yogeswaren |
| 8,756,016 B2 | 6/2014 | Tabanou et al. |
| 8,898,046 B2 | 11/2014 | Moos et al. |
| 9,022,140 B2 | 5/2015 | Marx et al. |
| 9,062,545 B2 | 6/2015 | Roberts et al. |
| 9,063,251 B2 | 6/2015 | Moos |
| 9,110,190 B2 | 8/2015 | Yogeswaren |
| 9,152,745 B2 | 10/2015 | Glinsky |
| 9,305,121 B2 | 4/2016 | Yao et al. |
| 9,390,204 B2 | 7/2016 | Bowen et al. |
| 9,417,348 B2 | 8/2016 | Lin |
| 9,435,192 B2 | 9/2016 | Lawrence et al. |
| 9,465,140 B2 | 10/2016 | Crawford et al. |
| 9,618,652 B2 | 4/2017 | Weng et al. |
| 9,677,393 B2 | 6/2017 | Morris |
| 9,988,895 B2 | 6/2018 | Roussel et al. |
| 10,001,003 B2 | 6/2018 | Dusseault et al. |
| 10,302,785 B2 | 5/2019 | Dirksen et al. |
| 10,352,145 B2 | 7/2019 | Maxwell et al. |
| 10,422,208 B2 | 9/2019 | Weng et al. |
| 10,563,493 B2 | 2/2020 | Ganguly et al. |
| 10,571,605 B2 | 2/2020 | Crawford et al. |
| 10,607,043 B2 | 3/2020 | Camargo et al. |
| 10,724,346 B2 | 7/2020 | Eftekhari Far et al. |
| 10,760,416 B2 | 9/2020 | Weng et al. |
| 10,787,887 B2 | 9/2020 | Pankaj et al. |
| 10,920,538 B2 | 2/2021 | Herrera et al. |
| 10,920,552 B2 | 2/2021 | Herrera et al. |
| 11,098,582 B1 | 8/2021 | Camargo et al. |
| 2007/0100594 A1 | 5/2007 | Lamoureux-Var et al. |
| 2007/0255545 A1* | 11/2007 | Pita ............... G01V 11/00 |
| | | 703/10 |
| 2007/0272407 A1 | 11/2007 | Lehnman et al. |
| 2009/0319243 A1 | 12/2009 | Suarf7-Rivera et al. |
| 2010/0250216 A1 | 9/2010 | Narr et al. |
| 2012/0072188 A1 | 3/2012 | Maerten et al. |
| 2013/0299241 A1 | 11/2013 | Alberty et al. |
| 2013/0312974 A1* | 11/2013 | McClung, IV ........ C09K 8/605 |
| | | 166/308.1 |
| 2014/0358510 A1 | 12/2014 | Sarkar et al. |
| 2015/0276979 A1 | 10/2015 | Hugot et al. |
| 2015/0315485 A1* | 11/2015 | Morris ............... C10G 21/30 |
| | | 95/8 |
| 2016/0222765 A1 | 8/2016 | Nooruddin et al. |
| 2016/0266274 A1 | 9/2016 | Alqam et al. |
| 2016/0266278 A1 | 9/2016 | Holderby et al. |
| 2017/0051598 A1 | 2/2017 | Duenes |
| 2017/0132339 A1 | 5/2017 | Umholtz et al. |
| 2017/0145793 A1 | 5/2017 | Ouenes |
| 2017/0176228 A1 | 6/2017 | Elisabeth |
| 2017/0205531 A1 | 7/2017 | Berard et al. |
| 2017/0316128 A1 | 11/2017 | Huang et al. |
| 2018/0203146 A1 | 7/2018 | Den Boer et al. |
| 2019/0080122 A1 | 3/2019 | Camargo et al. |
| 2019/0345815 A1 | 11/2019 | Mishra |
| 2021/0054736 A1 | 2/2021 | Moos et al. |
| 2021/0102461 A1 | 4/2021 | Kumar et al. |
| 2021/0132246 A1 | 5/2021 | Liu et al. |
| 2021/0222518 A1 | 7/2021 | Bardy et al. |
| 2021/0350052 A1 | 11/2021 | Alwahtani et al. |
| 2022/0018245 A1 | 1/2022 | Coenen |

FOREIGN PATENT DOCUMENTS

| | | |
|---|---|---|
| CA | 2932670 A1 | 12/2017 |
| CN | 102788994 B | 1/2015 |
| CN | 104459775 B | 3/2015 |
| CN | 104500050 A | 5/2015 |
| CN | 105403929 A | 3/2016 |
| CN | 105484741 A | 4/2016 |
| CN | 103064114 B | 5/2016 |
| CN | 106285659 A | 1/2017 |
| CN | 104992468 B | 1/2018 |
| CN | 105134156 B | 5/2018 |
| CN | 108331555 A | 7/2018 |
| CN | 110850057 B | 4/2021 |
| CN | 112253103 B | 8/2021 |
| CN | 112065351 B | 9/2021 |
| CN | 109102180 B | 11/2021 |
| CN | 112526107 B | 11/2021 |
| CN | 109388817 B | 2/2022 |
| EP | 3118758 A1 | 1/2017 |
| FR | 2979016 A | 2/2013 |
| KR | 102111207 B1 | 5/2020 |
| RU | 2404359 C2 | 11/2010 |
| WO | 2010111398 A2 | 9/2010 |
| WO | 2013169256 A1 | 11/2013 |
| WO | 2015168417 A1 | 11/2015 |
| WO | 2016122792 A1 | 8/2016 |
| WO | 2016209822 A1 | 12/2016 |
| WO | 2017019388 A1 | 2/2017 |
| WO | 2020167282 A1 | 8/2020 |
| WO | 2020198210 A1 | 10/2020 |
| WO | 2021108439 A1 | 6/2021 |
| WO | 2021236877 A1 | 11/2021 |

OTHER PUBLICATIONS

Camargo, Otto E. Meza et al.; "Reservoir Stress Path from 4D Coupled High Resolution Geomechanics Model: A Case Study for Jauf Formation, North Ghawar, Saudi Arabia" Saudi Aramco Journal of Technology, Fall 2016; pp. 45-59.

Engelder, Terry et al.; "Chapter 15: A Pore-Pressure Limit in Overpressured South Texas Oil and Gas Fields" pp. 255-267, AAPG Memoir 67, 1997; pp. 255-267.

Fischer, K. et al.; "A workflow for building and calibrating 3-D geomechoanical models—a case study for a gas reservoir in the North German Basin" Solid Earth, 4, (2013); pp. 347-355.

Herwanger, J., Seismic Geomechanics, How to Build and Calibrate Geomechanical Models using 3D and 4D Seismic Data, 1 Edn., EAGE Publications b.v. Houten, 2011; Chapter 2, pp. 19-39, Chapter 6, pp. 102-118.

International Search Report and Written Opinion for International Application No. PCT/US2021/018379 (SA51284) report dated May 28, 2021; pp. 1-16.

Jorgensen, Bo Barker et al.; "Bacterial Sulfate Reduction Above 100C in Deep-Sea Hydrothermal Vent Sediments" (Abstract only) Science, vol. 258, Issue 5089, Dec. 11, 1992; pp. 1756-1757.

Koutsabeloulis, N.C. et al.; "Numerical geomechanics in reservoir engineering" Computer Methods and Advances in Geomechanics, A.A. Balkema, Rotterdam, The Netherlands, 1994; pp. 2097-2104.

Matyasik, Irena et al.; "Genesis of hydrogen sulfide in carbonate reservoirs" NAFTA-GAZ, ROK LXXIV, Nr Sep. 2018; pp. 627-635.

Orr, Wilson L.; "Changes in Sulfur Content and Isotopic Ratios of Sulfur during Petroleum Maturation—Study of Big Horn Basin Paleozoic Oils" The American Association of Petroleum Geologists Bulletin, V. 58, No. 11 (Nov. 1974); pp. 2295-2318.

Worden, R.H. et al.; "Gas Souring by Thermochemical Sulfate Reduction by 140C1" The American Association of Petroleum Geologists Bulletin, V. 79, No. 6 (Jun. 1995); pp. 854-863.

Worden, Richard H. et al.; "Origin of H2S in Khuff Reservoirs by Thermochemical Sulfate Reduction: Evidence from Fluid Inclusions" Saudi Aramco Journal of Technology, Fall 2004; pp. 42-52.

Zhu, GuangYou et al.; "The controlling factors and distribution prediction of H2S formation in marine carbonate gas reservoir, China" (abstract only) Chinese Science Bulletin, vol. 52 (2007), pp. 150-163.

Zoback, M., Reservoir Geomechanics, Cambridge University Press, UK, 2007/2010, pp. 19-21.

Fischer, K. et al.; "Generating and Calibrating 3D Geomechanical Reservoir Models" 75th EAGE Conference and Exhibition incorporating SPE EUROPEC 2013, London UK, Jun. 10-13, 2013; pp. 1-5.

(56) References Cited

OTHER PUBLICATIONS

Ahmadi, Mohammad Ali; "Toward Reliable Model for Prediction Drilling Fluid Density at Wellbore Conditions: A LSSVM Model" Depailment of Petroleum Engineering, Ahwaz Faculty of Petroleum Engineering; pp. 1-34.

Al-Hawas, Khalid et al.; Delineation of fracture anisotropy signatures in Wudayhi Field by azimuthal seismic data; The Leading Edge, Interpreter's Corner, Dec. 2003; pp. 1202-1211.

Al-Nutaifi et al.; "Wellbore Instability Analysis for Highly Fractured Carbonate Gas Reservoir from Geomechanics Prospective, Saudi Arabia Case Study" International Petroleum Technology Conference, Kuala Lumpur, Malaysia, Dec. 10-12, 2014; pp. 1-10.

Aldrich, Jeffrey B. et al.; "'Sweet Spot' Identification and Optimization in Unconventional Reservoirs" Search and Discovery Article #80644 (2018); pp. 1-6.

ArcGIS; "How Kernel Density works" available as of Jan. 28, 2022 at: https://desktop.arcgis.com/en/arcmap/10.6/tools/spatial-analyst-toolbox/how-kernel-density-works.htm; pp. 1-3.

Barree, R.D. et al.; "Holistic Fracture Diagnostics" SPE 107877, Rocky Mountain Oil & Gas Technology Symposium, Denver, CO, Apr. 16-18, 2007; pp. 1-13.

Chen, Sheng et al.; "Prediction of sweet spots in shale reservoir based on geophysical well logging and 3D seismic data" Energy Exploration & Exploitation, vol. 35(2), 2017; pp. 147-171.

Gan, Quan et al.; "A continuum model for coupled stress and fluid flow in discrete fracture networks" Geomech. Geophys. Geo-energ. Geo-resour. (2016); pp. 2:43-61.

Gray, F. David et al.; "Fracture detection in the Manderson Field: A 3D AVAZ case history" Society of Exploration Geophysicists, Jan. 5, 2005; pp. 1-4.

International Search Report and Written Opinion for International Application No. PCT/US2018/046824 report dated Nov. 28, 2018; pp. 1-13.

International Search Report and Written Opinion for International Application No. PCT/US2020/062069, report dated Mar. 11, 2021; pp. 1-18.

Khadivi, Kourosh et al.; "Integrated fracture characterization of Asmari reservoir in Haftkel field" Journal of Petroleum Exploration and Production Technology, Jan. 4, 2022; pp. 1-21.

Lei, Qinghua et al.; The Use of Discrete Fracture Networks for Modelling Coupled Geomechnical and Hydrological Behaviour of Fractured Rocks, Computers and Geotechnics 85, 2017; pp. 151-176.

Liu, Naizhen et al.; "Shale gas sweet spot identification and precise geo-steering drilling in Weiyuan Block of Sichuan Basin, SW China" Petroleum Exploration and Development, vol. 43, Issue 6, Dec. 2016; pp. 1-9.

Maerten, F.; "Adaptive cross-approximation applied to the solution of system of equations and post-Processing for 3D elastostatic problems using the boundary element Method" Engineering Analysis with Boundary Elements 34, 2010; pp. 483-491.

Nejadi, Siavash et al.; "History matching and uncertainty quantification of discrete fracture network models in fractured reservoirs" Journal of Petroleum Science and Engineering 152 (2017); pp. 21-32.

Rogers S. et al., "Integrating discrete fracture network models and pressure transient data for testing conceptual fracture models of the Valhall chalk reservoir, Norway North Sea"; Geological Society, London, Special Publications, 270, 2007, pp. 187-197.

Rogers, Stephen F.; "Critical stress-related permeability in fractured rocks", Chpt 2, Fracture and In-Situ Stress Characterization of Hydrocarbon Reservoirs, (AMEEN) Geoscience World, The Geological Society of London, Jan. 1, 2003; pp. 7-16.

Sorkhabi, Rasoul, Ph.D.; "Locating Sweet Spots: Shale Petroleum Systems" available as of Dec. 28, 2021 at: https://www.geoexpro.com/articles/2020/06/locating-sweet-spots-shale-petroleum-systems; vol. 17, No. 2—2020; pp. 1-10.

Silverman, B.W.; "Density Estimation for Statistics and Data Analysis" Monographs on Statistics and Applied Probability, London: Chapman and Hall, 1986; pp. 1-22.

Tokhmchi, Behzad et al.; "Estimation of the fracture density in fractured zones using petrophysical logs" Journal of Petroleum Science and Engineering 72 (2010); pp. 206-213.

U.S. Appl. No. 17/476,914 titled "Identifying Fluid Flow Paths in Naturally Fractured Reservoirs" filed Sep. 16, 2021.

U.S. Appl. No. 17/690,484 titled "Geo-Mechanical Based Determination of Sweet Spot Intervals for Hydraulic Fracturing Stimulation" filed Mar. 9, 2022.

Zellou, Abdel et al.; "Fractured Reservoir Characterization Using Post-Stack Seismic Attributes: Application to a Hungarian Reservoir", EAGE 68th Conference & Exhibition—Vienna, Austria, Jun. 12-15, 2006; pp. 1-4.

Barton, Colleen A. et al.; "Fluid flow along potentially actuve faults in crystalline rock" Geology, Aug. 1995; v. 23; No. 8; pp. 683-686.

Bisdom, Kevin et al.; "A geometrically based method for predicting stress-induced fracture aperture and flow in discrete fracture networks" AAPG Bulletin v. 100, No. 7 (Jul. 2016); pp. 1075-1097.

Bisdom, Kevin et al.; "The impact of in-situ stress and outcrop-based fracture geometry on hydraulic aperture and upscaled permeability in fractured reservoirs" (abstract only) Tectonphysics v. 690, Part A, Oct. 28, 2010; pp. 63-75.

Cao, Yang-Bing et al.; "Calculation Method and Distribution Characteristics of Fracture Hydraulic Aperture from Field Experiments in Fractured Granite Area" (abstract only), Springer Ling, Nov. 9, 2015; pp. 1-18.

Cappa, F. et al.; "Estimation of fracture flow parameters through numerical analysis of hydromechanical pressure pulses" Water Resources Research, American Geophysical Union, 2008, 44, pp. W11408; pp. 1-49.

Luthi, S.M. et al.; "Fracture apertures from electrical borehole scans" Geophysics, vol. 55, No. 7, Jul. 1990; pp. 821-833.

Min, Ki-Bok et al.; "Stress-Dependent Permeability of Fractured Rock Masses: A Numerical Study" International Journal of Rock Mechanics and Mining Sciences, vol. 41, Issue 7, 2004; pp. 1191-1210.

Schlumberger; "Welcome to Techlog online help 2018.2" 2018; pp. 1-2.

Alcantara, Ricardo et al.; "A Dynamic Characterization Approach for a Complex Naturally Fractured Reservoir" International Petroleum Technology Conference, Beijing, China, Mar. 26-28, 2019; pp. 1-40.

ArcGIS; "How Line Density works" available as of Jan. 18, 2022 at: https://desktop.arcgis.com/en/arcmap/10.6/tools/spatial-analyst-toolbox/how-line-density-works.htm; pp. 1-3.

ArcGIS Pro 2.8; "An overview of the Density toolset" available as of Apr. 4, 2022 at: https://pro.arcgis.com/en/pro-app/2.8/tool-reference/spatial-analyst/an-overview-of-the-density-tools.htm; p. 1.

ArcGIS Pro 2.8; "How Kernel Density Works" Available as of Mar. 14, 2022 at: https://pro.arcgis.com/en/pro-app/2.8/tool-reference/spatial-analyst/how-kernel-density-works.htm; pp. 1-6.

ArcGIS Pro 2.8; "Kernel Density (Spatial Analyst)" available as of Mar. 14, 2022 at: https://pro.arcgis.com/en/pro-app/2.8/tool-reference/spatial-analyst/kernel-density.htm; pp. 1-5.

ArcGIS Pro 2.8; "Line Density (Spatial Analyst)" available as of Apr. 4, 2022 at: https://pro.arcgis.com/en/pro-app/2.8/tool-reference/spatial-analyst/line-density.htm; pp. 1-6.

ArcGIS Pro 2.8; "Point Density (Spatial Analyst)" available as of Apr. 4, 2022 at: https://pro.arcgis.com/en/pro-app/2.8/tool-reference/spatial-analyst/point-density.htm; pp. 1-7.

Jiang, Le et al.; "Simulation and Optimization of Dynamic Fracture Parameters for an Inverted Square Nine-Spot Well Pattern in Tight Fractured Oil Reservoirs" Hindawi, Geofluids, vol. 2020, Article ID 8883803; pp. 1-9.

Liu, Shiqi et al.; "Geological and Engineering Integrated Shale Gas Sweet Spots Evaluation Based on Fuzzy Comprehensive Evaluation Method: A Case Study of Z Shale Gas Field HB Block" Energies 2022, 15, 602, Jan. 14, 2022; pp. 1-20.

Ouenes, Ahmed; "Stress Modeling '3-G' Workflow Pinpoints Shale Sweet Spots" The American Oil & Gas Reporter, Jul. 2015; pp. 1-3.

U.S. Appl. No. 17/712,820 titled "System and Method to Develop Naturally Fractured Hydrocarbon Reservoirs Using a Fracture Density Index" filed Apr. 4, 2022.

(56) References Cited

OTHER PUBLICATIONS

U.S. Appl. No. 17/721,064 titled "Identifying Naturally Fractured Sweet Spots Using a Fracture Density Index (FDI)" filed Apr. 14, 2022.
Wikipedia; "Kernel density estimation" available as of Apr. 4, 2022 at: https://en.wikipedia.org/wiki/Kernel_density_estimation#:~:text=In statistics%2C kernel density estimation,on a finite data sample; pp. 1-12.

\* cited by examiner

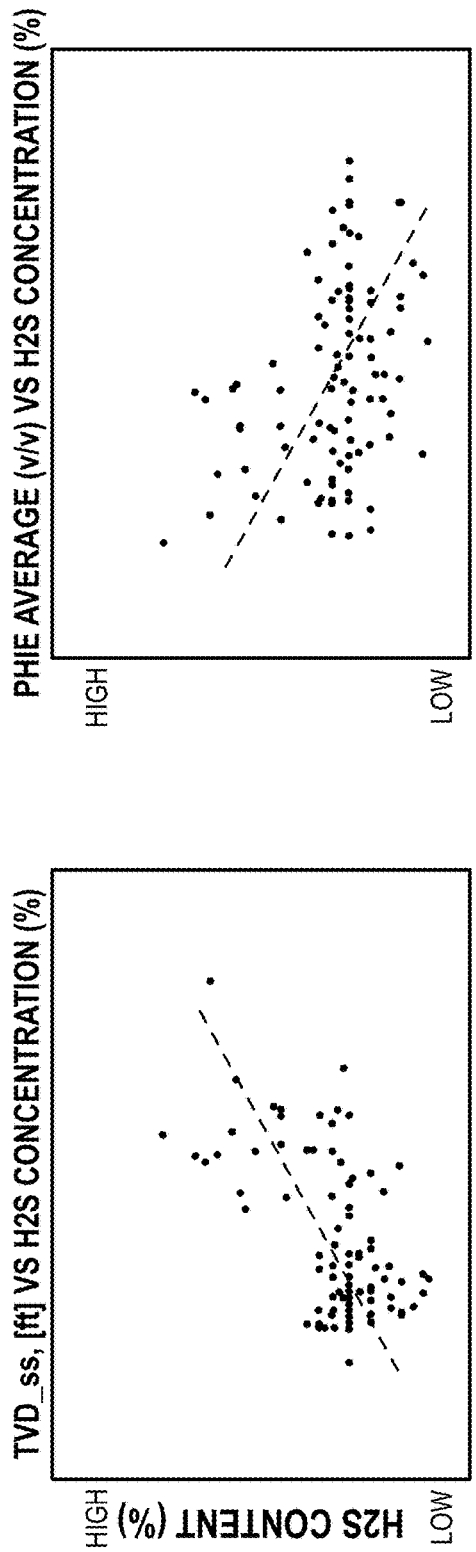
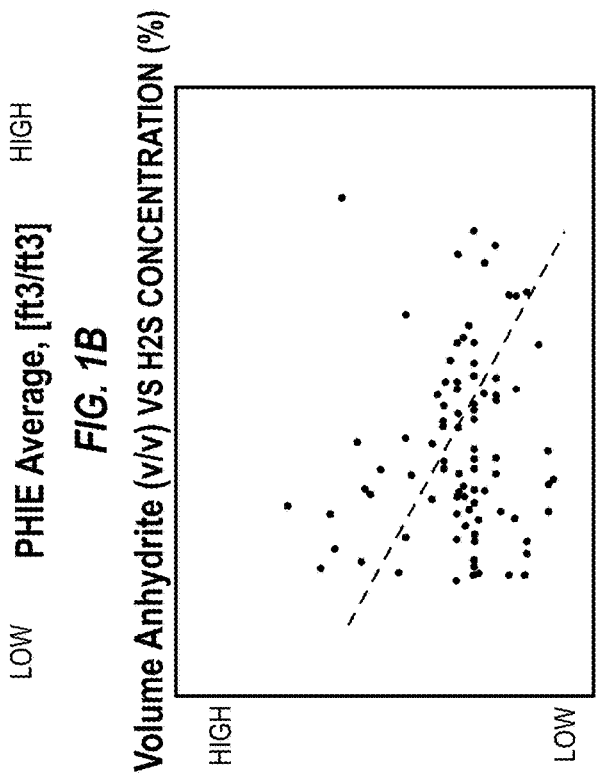
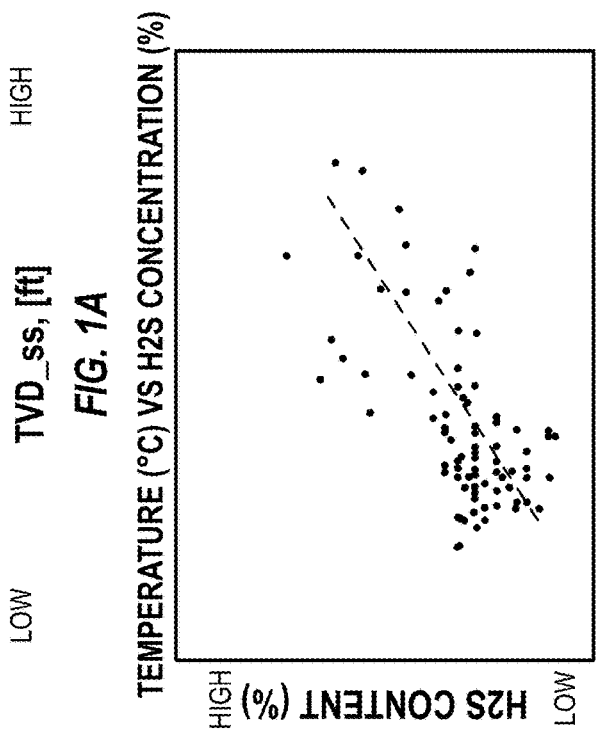
FIG. 1A — TVD_ss, [ft]
FIG. 1B — PHIE Average, [ft3/ft3]
FIG. 1C — Temperature (°C)
FIG. 1D — Volume Anhydrite

DETERMINING HYDROGEN SULFIDE (H2S) CONCENTRATION AND DISTRIBUTION IN CARBONATE RESERVOIRS USING GEOMECHANICAL PROPERTIES

BACKGROUND

Field of the Disclosure

The present disclosure generally relates to the extraction of hydrocarbon (for example, oil and gas) resources. More specifically, embodiments of the disclosure relate to related to determining the distribution of hydrogen sulfide ($H_2S$) in carbonate formations.

Description of the Related Art

The extraction of hydrocarbon resources from reservoirs in rock formations may depend on a variety of factors. For example, the presence of hydrogen sulfide ($H_2S$) may dilute the proportion of extracted and produced hydrocarbons that are economically valuable. Moreover, hydrogen sulfide ($H_2S$) is corrosive and can damage production equipment. The prediction of the occurrence and distribution of hydrogen sulfide ($H_2S$) is particularly important for the exploration and development of gas fields. However, such predictions are challenging due to the various factors—tectonics, lithofacies, geochemical, hydrogeological, and thermodynamic—that can affect the generation of hydrogen sulfide ($H_2S$).

SUMMARY

Hydrogen sulfide ($H_2S$) may be generated by various mechanisms, such as the presence of anhydrite with relatively higher temperature and pressures, as well as external fluid extraction. One mechanism for the generation of hydrogen sulfide ($H_2S$) is thermochemical sulfate reduction; this mechanism may contribute to a relatively large (e.g., greater than 10%) concentration in gas souring carbonate reservoirs.

Several correlations may be attempted to evaluate a possible relationship between hydrogen sulfide ($H_2S$) concentration and variables such as rock quality, depth, anhydrite volume, temperature, and other variables. By way of example, FIGS. 1A-1D show various attempted correlations between hydrogen sulfide ($H_2S$) concentration and different variables. FIG. 2A shows a plot of hydrogen sulfide ($H_2S$) concentration (%) vs true vertical depth (TVD) in feet (ft), FIG. 2B shows a plot of hydrogen sulfide ($H_2S$) concentration (%) vs temperature (° C.), FIG. 2C shows a plot of hydrogen sulfide ($H_2S$) concentration (%) vs effective porosity (PHIE) average in volume per volume (v/v), and FIG. 2D shows a plot of hydrogen sulfide ($H_2S$) concentration (%) vs volume anhydrite in volume per volume). As shown in these figures, the coefficient of correlation between each of these variables is less than 0.1 (that is, $R_2 > 0.1$).

Embodiments of the disclosure use a mechanical earth model to determine a correlation between hydrogen sulfide ($H_2S$) and various stresses and to subsequently determine the distribution of hydrogen sulfide ($H_2S$) in a carbonate reservoir.

In one embodiment, a method for determining hydrogen sulfide ($H_2S$) concentration in a carbonate reservoir is provided. The method includes obtaining a plurality of measurements from one or wells accessing the carbonate reservoir and determining a plurality of hydrogen sulfide ($H_2S$) concentration values from the plurality of measurements. Additionally, the method includes determining a plurality of maximum horizontal stress values such that the plurality of maximum horizontal stress values are determined from reservoir parameters representing properties of the carbonate reservoir. The method also includes correlating the plurality of hydrogen sulfide ($H_2S$) concentration values with the plurality of maximum horizontal stress values and determining a concentration of hydrogen sulfide ($H_2S$) concentration at a depth in the carbonate reservoir using the correlation.

In some embodiments, the method includes determining a plurality of stress ratio values, such that the stress ratio is a ratio of the maximum horizontal stress to the minimum horizontal stress, and correlating the plurality of hydrogen sulfide ($H_2S$) concentration values with the plurality of stress ratio values. In some embodiments, correlating the plurality of hydrogen sulfide ($H_2S$) concentration values with the plurality of maximum horizontal stress values includes correlating the plurality of hydrogen sulfide ($H_2S$) concentration values to the plurality of maximum horizontal stress values for maximum horizontal stress values greater than 17,500 psi. In some embodiments, the reservoir parameters representing properties of the carbonate reservoir include dynamic mechanical properties of the rock in the subsurface geological structure. In some embodiments, the reservoir parameters representing properties of the carbonate reservoir include static mechanical properties of the rock in the subsurface geological structure. In some embodiments, obtaining a plurality of measurements from one or wells accessing the carbonate reservoir includes obtaining bulk density logs and acoustic sonic logs. In some embodiments, the method includes generating a hydrogen sulfide ($H_2S$) concentration map, such that the hydrogen sulfide ($H_2S$) concentration map is a map of hydrogen sulfide ($H_2S$) concentration values for a model of the carbonate reservoir.

In another embodiment, a non-transitory computer-readable storage medium having executable code stored thereon for determining hydrogen sulfide ($H_2S$) concentration in a carbonate reservoir is provided. The executable code includes a set of instructions that causes a processor to perform operations that include obtaining a plurality of measurements from one or wells accessing the carbonate reservoir and determining a plurality of hydrogen sulfide ($H_2S$) concentration values from the plurality of measurements. Additionally, the operations include determining a plurality of maximum horizontal stress values such that the plurality of maximum horizontal stress values are determined from reservoir parameters representing properties of the carbonate reservoir. The operations also include correlating the plurality of hydrogen sulfide ($H_2S$) concentration values with the plurality of maximum horizontal stress values and determining a concentration of hydrogen sulfide ($H_2S$) concentration at a depth in the carbonate reservoir using the correlation.

In some embodiments, the operations include determining a plurality of stress ratio values, such that the stress ratio is a ratio of the maximum horizontal stress to the minimum horizontal stress, and correlating the plurality of hydrogen sulfide ($H_2S$) concentration values with the plurality of stress ratio values. In some embodiments, correlating the plurality of hydrogen sulfide ($H_2S$) concentration values with the plurality of maximum horizontal stress values includes correlating the plurality of hydrogen sulfide ($H_2S$) concentration values to the plurality of maximum horizontal stress values for maximum horizontal stress values greater than 17,500 psi. In some embodiments, the reservoir parameters representing properties of the carbonate reservoir include dynamic mechanical properties of the rock in the subsurface geological structure. In some embodiments, the reservoir parameters representing properties of the carbonate reservoir include static mechanical properties of the rock in the subsurface geological structure. In some embodiments, obtaining a plurality of measurements from one or wells accessing the carbonate reservoir includes obtaining bulk density logs and acoustic sonic logs. In some embodiments, the method includes generating a hydrogen sulfide ($H_2S$) concentration map, such that the hydrogen sulfide ($H_2S$) concentration map is a map of hydrogen sulfide ($H_2S$) concentration values for a model of the carbonate reservoir.

In another embodiment, a system for determining hydrogen sulfide ($H_2S$) concentration in a carbonate reservoir is provided. The system includes a processor and a non-transitory computer-readable memory accessible by the processor and having executable code stored thereon. The executable code includes a set of instructions that causes a processor to perform operations that include obtaining a plurality of measurements from one or wells accessing the carbonate reservoir and determining a plurality of hydrogen sulfide ($H_2S$) concentration values from the plurality of measurements. Additionally, the operations include determining a plurality of maximum horizontal stress values such that the plurality of maximum horizontal stress values are determined from reservoir parameters representing properties of the carbonate reservoir. The operations also include correlating the plurality of hydrogen sulfide ($H_2S$) concentration values with the plurality of maximum horizontal stress values and determining a concentration of hydrogen sulfide ($H_2S$) concentration at a depth in the carbonate reservoir using the correlation.

In some embodiments, the operations include determining a plurality of stress ratio values, such that the stress ratio is a ratio of the maximum horizontal stress to the minimum horizontal stress, and correlating the plurality of hydrogen sulfide ($H_2S$) concentration values with the plurality of stress ratio values. In some embodiments, correlating the plurality of hydrogen sulfide ($H_2S$) concentration values with the plurality of maximum horizontal stress values includes correlating the plurality of hydrogen sulfide ($H_2S$) concentration values to the plurality of maximum horizontal stress values for maximum horizontal stress values greater than 17,500 psi. In some embodiments, the reservoir parameters representing properties of the carbonate reservoir include dynamic mechanical properties of the rock in the subsurface geological structure. In some embodiments, the reservoir parameters representing properties of the carbonate reservoir include static mechanical properties of the rock in the subsurface geological structure. In some embodiments, obtaining a plurality of measurements from one or wells accessing the carbonate reservoir includes obtaining bulk density logs and acoustic sonic logs. In some embodiments, the method includes generating a hydrogen sulfide ($H_2S$) concentration map, such that the hydrogen sulfide ($H_2S$) concentration map is a map of hydrogen sulfide ($H_2S$) concentration values for a model of the carbonate reservoir.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 1A-1D are plots of attempted correlations between hydrogen sulfide ($H_2S$) concentration and different variables according to prior art techniques;

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Figure 2:
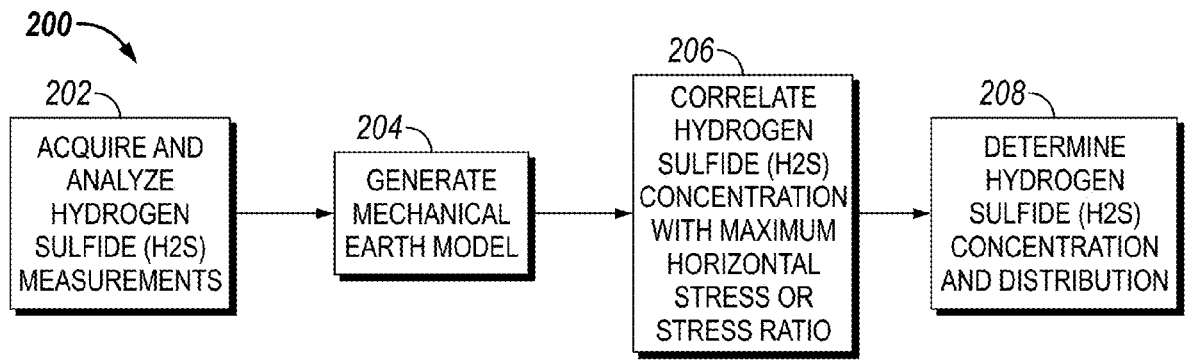
FIG. 2 is a block diagram of a process for correlating hydrogen sulfide ($H_2S$) using a mechanical earth model and determining the distribution of hydrogen sulfide ($H_2S$) in a carbonate reservoir in accordance with an embodiment of the disclosure.

FIG. 2 depicts a process 200 for correlating hydrogen sulfide ($H_2S$) using a mechanical earth model and determining the distribution of hydrogen sulfide ($H_2S$) in a carbonate reservoir in accordance with an embodiment of the disclosure. As shown in FIG. 2, the process 200 may include acquiring and analyzing hydrogen sulfide ($H_2S$) measurements (block 202), generating a mechanical earth model (block 204), correlating hydrogen sulfide ($H_2S$) concentration (block 206), and determining hydrogen sulfide ($H_2S$) concentration and distribution (block 208).

Initially, hydrogen sulfide ($H_2S$) data may be measured from one or more wells (e.g., exploratory wells) accessing a reservoir of interest in accordance with an embodiment of the disclosure. In some embodiments, hydrogen sulfide ($H_2S$) concentrations may be obtained using a fluid sample tester for the one or more wells accessing a reservoir of interest. In some embodiments, thermochemical sulfate reduction (TSR) may be assumed to be the primary geochemical factor for the generation of hydrogen sulfide ($H_2S$).

In some embodiments, the hydrogen sulfide ($H_2S$) concentration may be measured using pressure-volume-temperature (PVT) analysis to determine fluid behaviors and properties from fluid samples obtained from the one or more wells, such as via by a wireline formation tester tool. As will appreciated, hydrogen sulfide ($H_2S$) measurements may be affected by the partial or total loss of the gas by absorption/adsorption onto metal components of a downhole tool, storage bottles, and transfer and analysis system, particularly those components that include iron. However, hydrogen sulfide ($H_2S$) readily forms non-volatile and insoluble metal sulfides by reaction with many other metals and metal oxides, and analysis of the fluid samples can therefore underestimate the actual hydrogen sulfide ($H_2S$) content. By way of example, Table 1 shows various hydrogen sulfide ($H_2S$) concentration measurements for 16 wells accessing a single "A" reservoir showing the corresponding range for the measurements:

TABLE 1

| Well name | Formation | $H_2S$ Concentration (%) | | |
|---|---|---|---|---|
| | | $H_2S$ min (%) | $H_2S$ max (%) | $H_2S$ average (%) |
| Well 1 | A | 10.5 | 32.0 | 21.3 |
| Well 2 | A | 10.5 | 31.3 | 20.9 |
| Well 3 | A | 17.0 | 23.0 | 20.0 |
| Well 4 | A | 1.5 | 9.5 | 5.5 |
| Well 5 | A | 3.0 | 6.9 | 5.0 |
| Well 6 | A | 3.1 | 6.0 | 4.5 |
| Well 7 | A | 0.5 | 5.0 | 2.8 |
| Well 8 | A | 1.9 | 4.0 | 3.0 |
| Well 9 | A | 2.8 | 3.7 | 3.3 |
| Well 10 | A | 0.4 | 1.6 | 1.0 |
| Well 11 | A | 0.3 | 0.8 | 0.6 |
| Well 12 | A | 0.0 | 0.1 | 0.1 |
| Well 13 | A | 0.0 | 0.0 | 0.0 |
| Well 14 | A | 0.0 | 0.0 | 0.0 |
| Well 15 | A | 0.0 | 0.0 | 0.0 |
| Well 16 | A | 0.0 | 0.0 | 0.0 |

Embodiments of the disclosure may include an analysis of the source of hydrogen sulfide ($H_2S$) in a reservoir. Sources of hydrogen sulfide ($H_2S$) may include 1) bacterial or microbial sulfate reduction, 2) thermal decomposition of organic sulfur compounds in kerogen or oil, and 3) thermochemical sulfate reduction (TSR). However, bacterial sulfate reduction and thermal decomposition of organic sulfur compounds may only generate relatively low amounts of hydrogen sulfide ($H_2S$) (for example, less than 5%). In contrast, thermochemical sulfate reduction may contribute relatively large amounts of hydrogen sulfide ($H_2S$) (for example, greater than 10%).

Gas souring occurring through thermochemical sulfate reduction (TSR) of anhydrite by hydrocarbon gases may be expressed by the following reaction:

$$CaSO4+CH4+HEAT \Rightarrow CaCO3+H2S+H2O \qquad (1)$$

Sour gas (that is, gas containing significant amounts of hydrogen sulfide) is typically observed in reservoirs greater than a critical reaction temperature (for example, about 140° C. in a Permian-Triassic formation). Petrographic examination of cores from range of depths have shown that the anhydrite reactant has been replaced by calcite reaction product in core samples deeper than 4300 meters (m), and gas composition data shows that only reservoirs deeper than 4300 m contain relatively large quantities of hydrogen sulfide ($H_2S$). However, determining the distribution of hydrogen sulfide ($H_2S$) based only burial history temperature is challenging due to the effect of other factors, such as geotectonic, lithofacies, geochemical, hydrogeological, and thermodynamic, that may be accounted for when predicting areas and intervals that contain sour gas.

The example embodiments described in the disclosure are from a field have similar geologies to the Permian Triassic formation and have relatively large concentrations of hydrogen sulfide ($H_2S$). Petrographic and isotopic studies confirmed that thermochemical sulfate reduction (TSR) is the primary mechanism for hydrogen sulfide ($H_2S$) in the example field. Fluid inclusion analysis has showed that thermochemical sulfate reduction (TSR) occurs between 120° C. (248° F.) and 135° C. (275° F.).

As shown in FIG. 1, a mechanical earth model may be generated for a reservoir of interest (block 204). In some embodiments, the mechanical earth model may be implemented according to the techniques described in U.S. patent application Ser. No. 16/792,742 filed Feb. 27, 2020, and titled "DETERMINATION OF CALIBRATED MINIMUM HORIZONTAL STRESS MAGNITUDE USING FRACTURE CLOSURE PRESSURE AND MULTIPLE MECHANICAL EARTH MODEL REALIZATIONS," now issued U.S. Pat. No. 11,098,582, a copy of which is incorporated by reference in its entirety.

Well logs, such as bulk density logs and acoustic sonic logs, may be used as input to the mechanical earth model. However, such logs may not usable due to the effects of hole condition such as borehole wall rugosity (that is, washouts) and natural gas in rocks. In some embodiments, a bulk density log may be reconstructed from logs of the mineral rock volumes, porosity, and mineral density. In some embodiments, acoustic sonic logs (that is, sonic log velocities) may be reconstructed using formation rock models. Additionally, in some embodiments a Gassmann's equation for fluid substitution may be applied. These results may be evaluated for quality control using rock physics cross-plots as well as core analysis.

For the rock physics model, well log sonic acoustic and bulk density conditioning may be performed to be able to calculate reliable mechanical properties and stress estimations by removing the wellbore and fluid effects. As will be appreciated, this enhances the accuracy and consistency for computing elastic properties and improving the correlations between acoustic measurements and rock properties.

The rock physics model is focused on predicting dynamic pressure wave velocity $V_p$ and shear wave velocity $V_s$ as accurately as possible, which is suitable for further mechanical modeling. By using the porosity and clay content from well logs, an analysis of which rock physics models are most suitable may be performed. Several techniques such as Advanced Differential Effective Medium (DEM) to estimate P-wave and S-wave velocities are available in Techlog™ 2017 platform suite available from Schlumberger Ltd of Houston, Tex., USA. A tangential shear factor may be introduced to obtain optimal match with observed Vp/Vs ratios in the sandstones, since contact theory is known to over predict shear wave velocities by neglecting rotational freedom and slip at grain contacts. $V_p$ and $V_s$ are functions of porosity, clay content, differential pressure, and saturation. The setup of input parameters may be completed iteratively to find the best solid clay properties to be used for this dataset; that is, inverting for solid clay elasticity for the dataset, assuming that all other properties are known, and the model is correct. Calculated $V_p$ and $V_s$ may be calibrated with dynamic mechanical properties derived from core analysis to obtain the best fit between all available data.

The rock physics model may be formed based on physical principles to generate P-wave and S-wave velocities based on rock structure, composition, and properties. By assigning known values to certain of these formation rock parameters, such as clay and sand bulk- and shear-modulus, model velocities can also be obtained in corrupted intervals. The main advantage of this approach is that all relation between elastic properties and rock quality are preserved.

Figure 3:
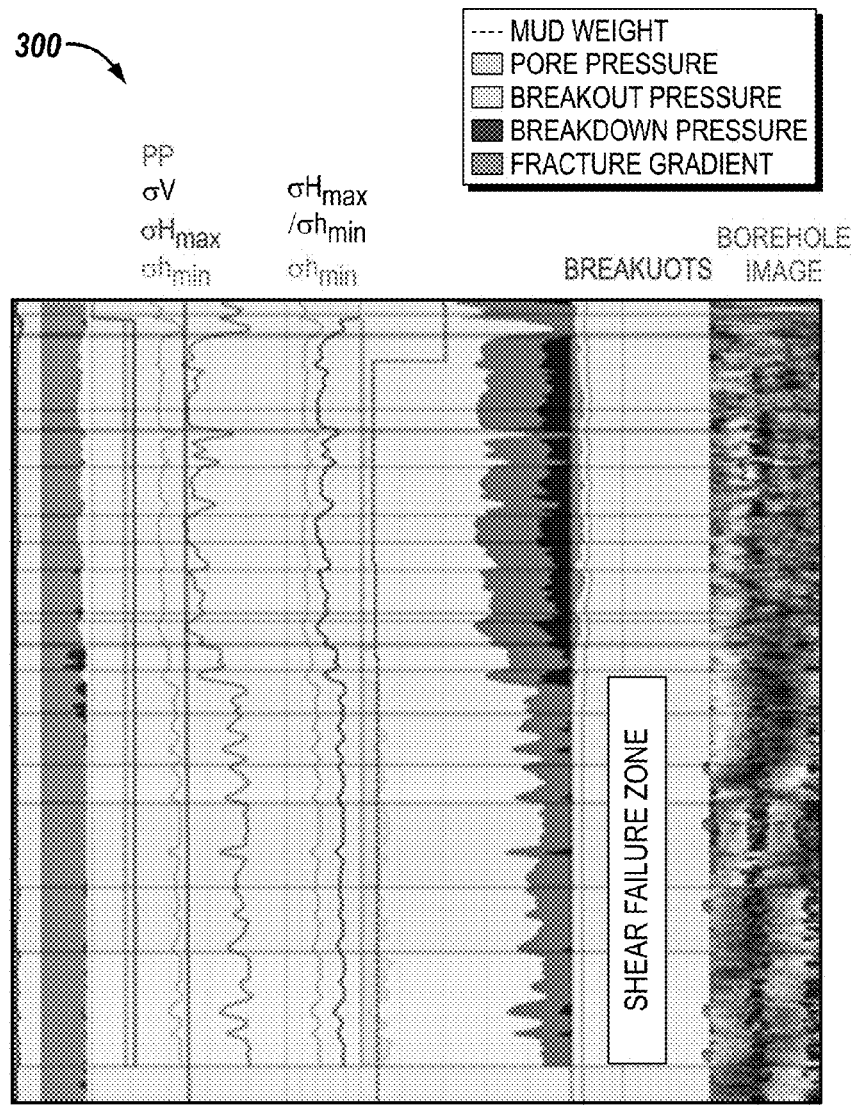
FIG. 3 is a composite log showing various mechanical and stress profiles as compared to wellbore stability and a borehole image log for a one-dimensional (1D) mechanical earth model in accordance with an embodiment of the disclosure.

After obtaining reconstructed bulk density logs and acoustic sonic logs, mechanical property determinations may be performed at the well level by determining elastic properties, stress regime, and magnitude using the poro-elasticity equations. Additionally, wellbore stability properties such as collapse pressure and breakdown pressure may be compared with the wellbore failure interpreted from borehole image logs to provide a basis for calibration. By way of example, FIG. 3 is a composite log 300 showing various mechanical and stress profiles as compared to wellbore stability (that is, breakouts) and a borehole image log for a one-dimensional (1D) mechanical earth model in accordance with an embodiment of the disclosure.

After determination of mechanical properties and the stress profile from a 1D mechanical earth model, the mechanical properties may recreated in a 3D grid block model and the bulk density and acoustic properties may be extrapolated. The mechanical earth model may include a 3-dimensional grid or data matrix structural framework that includes faults and structural surfaces of the subsurface formations in a region of interest. The grid cells may be formed as an unstructured grid representing the subsurface strata, with the dimensions and size of the grid cells governed by the desired degree of detail regarding the geological features, as well as the amount of computer processing time allocated. In some embodiments, the structural framework may be developed from seismic analysis and stratigraphy. The formed structural framework may be used in accordance with the present disclosure as an organizational matrix into which mechanical properties data are extrapolated. The grid cells in the structural framework data matrix stored in memory have associated mechanical properties of the subsurface structure at corresponding locations to the grid cells.

Embodiments of the process 100 may be applied in a strike-slip fault regime, such that the maximum horizontal stress ($S_{Hmax}$) is the largest principal stress ($S_{Hmax}>Sv>S_{hmin}$). The orientation can be constrained by using the borehole breakouts and drilling induced tensile fractures interpreted from borehole images.

In some embodiments, the minimum horizontal stress ($S_{hmin}$) and maximum horizontal stress ($S_{Hmax}$) profiles may be estimated using the poro-elastic and horizontal-strain stress model, such that the minimum and maximum horizontal stresses at each depth depend on mechanical properties, pore pressure, and vertical (overburden) stress. The mechanical earth model used in embodiments of the disclosure may include a stress tensor prediction module and a Stress Regime Magnitude Optimization Module. The stress tensor prediction may be based on determination of stresses for a number of realizations based on different sets of values for formation parameters. The tensor predictions or estimates may be determined using a suitable geomechanics numerical simulator.

The stress regime magnitude optimization module may determine three principal stresses (maximum horizontal stress $\sigma_{Hmax}$, minimum horizontal stress $\sigma_{hmin}$ and vertical stress $\sigma_V$). The stress regime magnitude optimization module may also provide quantification of the three principal stresses based on rock strength properties while modeling the wellbore stability incorporating drilling parameters.

A stress magnitude quantification performed by the stress tensor prediction module may be controlled by several sets of parameters which are distributed into the 3D geo-cellular grid model G of the subsurface region of interest. The parameters may include, for example, acoustic sonic wave data, bulk density, elastic properties, rock strength properties, fluid pore pressure and stress boundary conditions. In some embodiments, a fluid pore pressure model at pre-productions conditions may be generated from the direct measurements through a modular formation dynamics tester (MDT) and Bottom Hole Static Pressure (BHSP) estimated from hydraulic fracturing. The parameters discussed in the disclosure may be used to model an in-situ stress regime magnitude to produce a reliable mechanical earth model by using the poro-elasticity equation, and simulating the stress regime through a finite element geomechanics simulator.

An example of such finite element geomechanical simulation is set forth in: Koutsabeloulis, N. C., et al, "Numerical Geomechanics in Reservoir Engineering", *Computer Methods and Advances in Geomechanics* (The Netherlands, A. A. Balkema, Rotterdam) pp. 2097-2104, 1994. It should be understood that other finite element geomechanical simulation methods may also be used.

Figure 4:
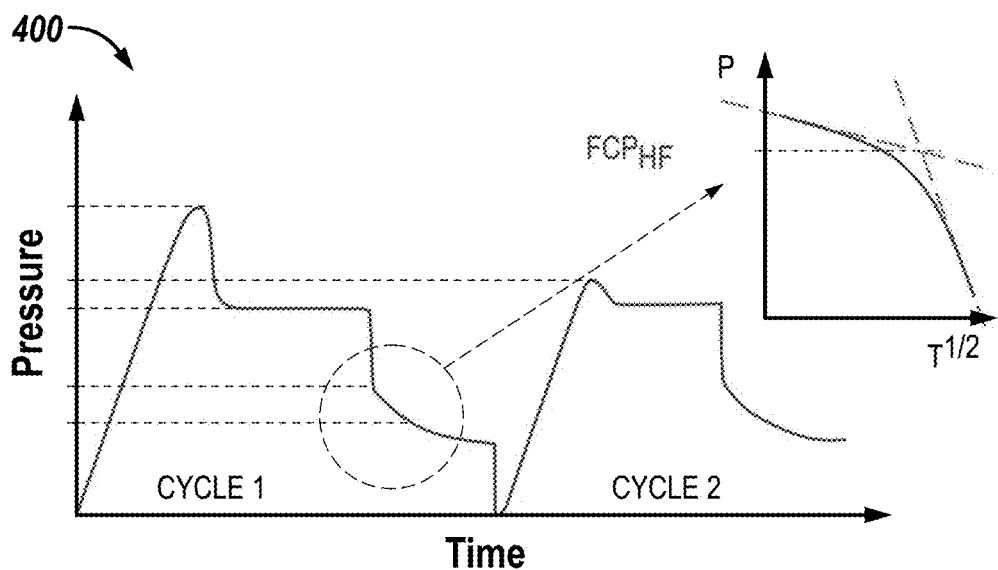
FIG. 4 is a plot of pressure vs time showing the fracture closure pressure estimation from hydraulic fracturing in accordance with an embodiment of the disclosure.

The minimum horizontal stress may be constrained with fracture close pressure (FCP) obtained by formation mechanical testing and leak off test (LOT) data. FIG. 4 depicts a plot 400 of pressure vs time showing the fracture closure pressure estimation from hydraulic fracturing in accordance with an embodiment of the disclosure. The stress profiles are plotted together with mud weight window, as shown in FIG. 4. In the example field described in the disclosure, the minimum horizontal stress was estimated based on hydraulic fracture data to be in the range of about 0.85 Psi/ft. to about 0.95 Psi/ft.

The maximum horizontal stress may be estimated using the poro-elastic model constrained by the wellbore stability model and drilling events. As discussed above and as shown in FIG. 3, the poro-elastic model may be calibrated with the borehole image interpretation (drilling induced tensile fractures (DITFs) and breakouts). In the example field described in the disclosure, the estimated gradient of maximum principal horizontal stress magnitude is about 1.5 Psi/ft.

The stress tensor prediction module of the mechanical earth model may predict stress tensors. In some embodiments, a suitable finite element stress prediction simulator determines stress tensor matrix components. An example of such finite element stress prediction simulator is set forth in Engelder, T., and Leftwich, Jr., J. T., "A Pore-Pressure Limit in Overpressured South Texas Oil and Gas Fields," AAPG Memoir 67, pp. 255-267, 1997. It should be understood that in other embodiments, other finite element stress prediction simulator methods may also be used.

Under equilibrium conditions the stress tensors can be simplified in six components as shown defined in a Cartesian domain of coordinates $X_1$, $X_2$, $X_3$ as: $\sigma12=\sigma21$, $\sigma13=\sigma31$, $\sigma23=\sigma32$. The stress tensors may be shown in matrix format as:

$$\begin{pmatrix} \sigma11 & \sigma12 & \sigma13 \\ \sigma21 & \sigma22 & \sigma23 \\ \sigma31 & \sigma32 & \sigma33 \end{pmatrix} \quad (2)$$

The stress tensor prediction of the mechanical earth model may be based on transforming relationships expressed in terms of dynamic rock mechanical properties to relationships expressed in terms of static rock mechanical properties. The rock strength properties may be defined based on correlation functions. Examples of such correlation functions according to the present disclosure are between the dynamic Young's Modulus vs. static Young's Modulus; static Young's Modulus vs. Unconfined Compressional Strength; Porosity vs. Friction Angle; and Porosity vs. Compressional Strength. Poisson's ratio dynamic and static correlations may also be used to be established to introduce the parameters.

The relations between the rock strength properties parameters may be initially defined by a best fit correlation R2, between the static/dynamic elastic and the rock strength rock properties. The best fit correlation may be determined by calculating an equation and variables for each rock strength properties correlation parametrizing a range of variability of each component.

The 3D mechanical properties calculation may correspond to the elastic properties determined according to the initial correlations established by the rock mechanics correlation. To perform these determinations, a compressional velocity (Vp), shear velocity (Vs), and bulk density model may be extrapolated from the wells to the entire 3D grid model based on geostatistical techniques. This process can be performed by using a software package such as Petrel™ manufactured by Schlumberger Limited, of Houston, Tex., USA.

Stress boundary conditions may be received as inputs for stress tensor prediction as inputs for the geomechanical model to predict the stress and "strain tectonic regime" of the stress tensors. This method may be performed solve the poro-elasticity equations, minimum stress gradient, vertical stress gradient, and maximum horizontal stress direction.

In other embodiments, the fluid pore pressure may be defined by using seismic velocity and the compaction line technique or by using the reservoir pressure defined through a reservoir numerical simulations process. After defining the fluid pore pressure variables and their variability, the 3D boundary condition stress analysis may include determination of stress equilibrium values representing the present-day or pre-production conditions throughout a reservoir and its surroundings.

Due to the complex variation of structure and properties within a typical model, in some embodiments stress equilibrium may be solved by numerical simulations. In some embodiments, the geomechanical numerical simulator may be Visage™ manufactured by Schlumberger Limited of Houston, Tex., USA. A geomechanical numerical simulator uses a finite element method to determine the required solution, producing a 3D stress tensor for stress equilibrium conditions incorporating the magnitudes and orientations that vary both laterally and vertically. The 3D stress tensor for stress equilibrium conditions $\sigma 12=\sigma 21$, $\sigma 13=\sigma 31$, $\sigma 23=\sigma 32$ may then be provided as inputs to stress regime magnitude optimization module of the mechanical earth model.

The stress regime magnitude optimization module may be optimized by capturing a range of variability for each rock property and formation parameter variable introduced in the model. As described in the disclosure, these variables include elastic properties conversion from dynamic to static for the Young's Modulus (E) and Poisson's Ratio (v); Unconfined Compressive Strength (UCS); Tensile Strength (TS); stress boundary conditions; and petrophysical properties as porosity, mineral volume, and the like. The variables may be ranked during optimization and quantified for their impact on the stress prediction particularly in the minimum horizontal stress ($\sigma_{hmin}$) quantification. The optimization processing may then determine the difference between the simulated stress profile and an actual measurement calculated through an objective function by using an optimization methodology. The optimization methodology minimizes the difference by sampling from the distribution of each parameter creating iteratively new realizations.

The stress regime magnitude optimization module may determine three principal stresses (maximum horizontal stress $\sigma_{Hmax}$, minimum horizontal stress $\sigma_{Hmin}$ and vertical stress $\sigma_V$) based on the predicted stress tensors formed in Stress Tensor Prediction Module. In a strike-slip fault regime, the vertical stress ($S_v$) is the intermediate principal stress ($\sigma 22$).

Calculating the minimum horizontal stress magnitude from a matrix stress tensor according to the present disclosure may be constrained by additional information regarding characteristics of the formation rock obtained by actual measurements from the well. As discussed in the disclosure, these measurements may be obtained from testing, such as leak off test (LOT) or formation integrity testing (FIT); or from drilling events such as mud loss circulation, to provide an approximated $\sigma_{hmin}$ magnitude for use in the wellbore stability analysis.

In some embodiments, the calibration of the 3D earth mechanical model may be verified by the general magnitudes and trend direction of the stresses to ensure the model is accurate particularly regarding the choice of boundary conditions and the presence of faults which may impact stress distribution and direction.

Figure 5:
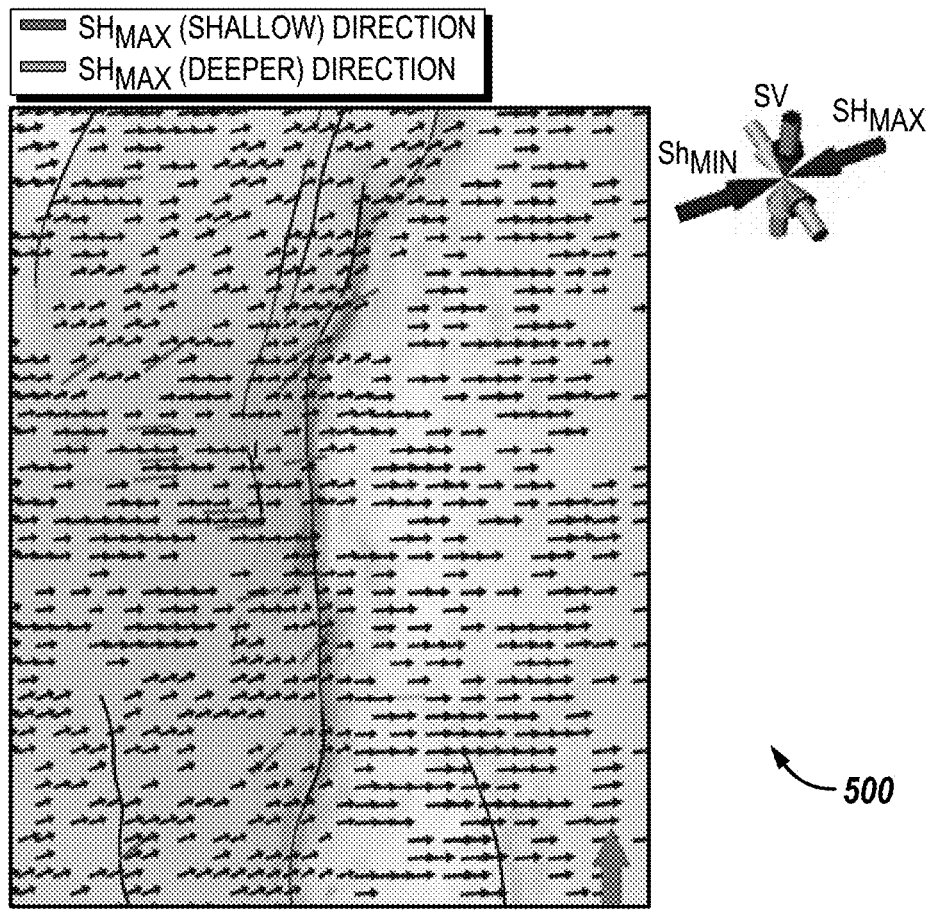
FIG. 5 is a map of horizontal stress directions as constrained by observed wellbore failure interpretations in accordance with an embodiment of the disclosure.

In such embodiments, 3D in-situ stress regime magnitudes and rotation may be modeled and compared to the 1D observed data. By way of example, FIG. 5 is a map 500 that illustrates the maximum horizontal stress directions as constrained by observed wellbore failure interpretations in accordance with an embodiment of the disclosure.

Figure 6:
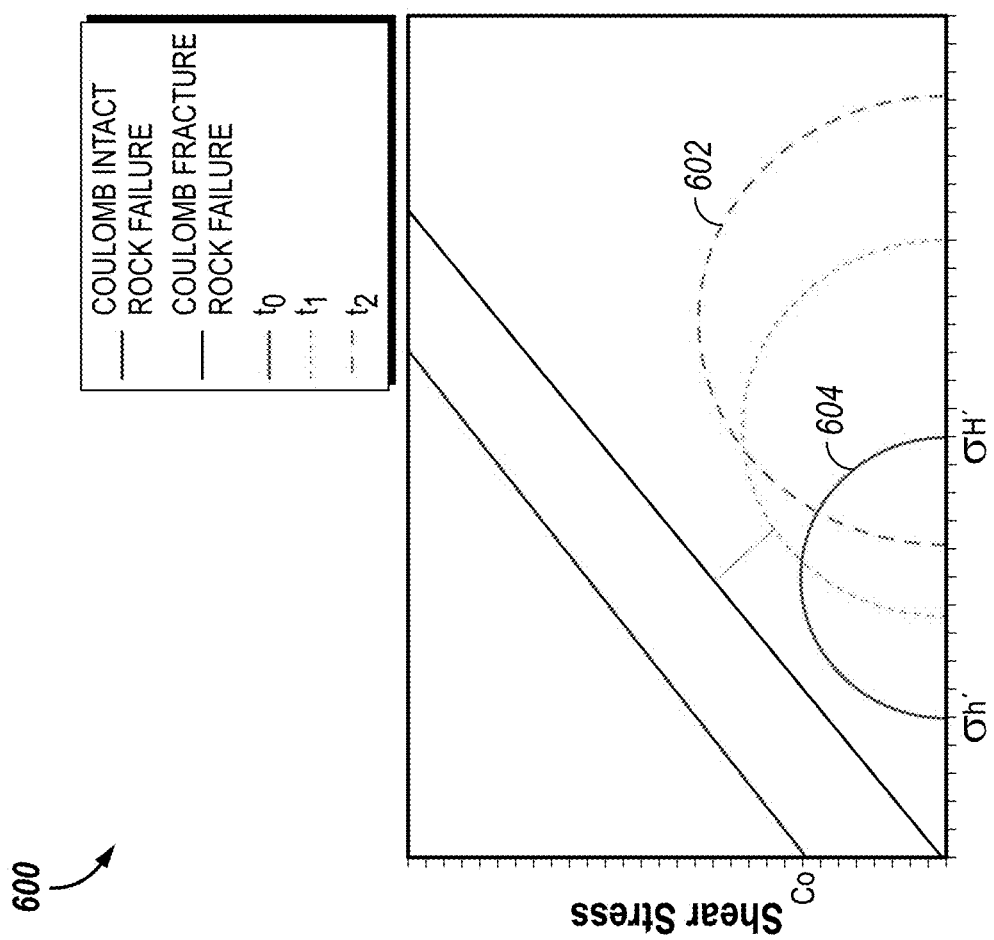
FIG. 6 is a plot of shear stress vs normal total stress in accordance with an embodiment of the disclosure.

The stress ratio between the maximum horizontal stress ($S_{Hmax}$) and the minimum horizontal stress ($S_{hmin}$) may be determined. This stress ratio reflects the differential between the magnitudes of the stress and is primarily affected by mechanical properties. Stiffer layers may exhibit a larger stress ratio, while less stiff layers may exhibit a smaller stress ratio. FIG. 6 is a plot 600 of shear stress vs normal total stress in accordance with an embodiment of the disclosure. FIG. 6 illustrates a difference between a stress ratio for stiffer layers (line 602) and less stiff layers (line 604).

A larger stress ratio may indicate layers having a variability in temperature and mechanical behavior; furthermore, the stress ratio may increase with depth following a normal or abnormal compaction trend. For a strike-slip regime with faults that influence the stress regime, an abnormal distribution in the stress ratio may be expected as the faults may perturb localized areas according to the current in-situ stress configuration.

Figure 7:
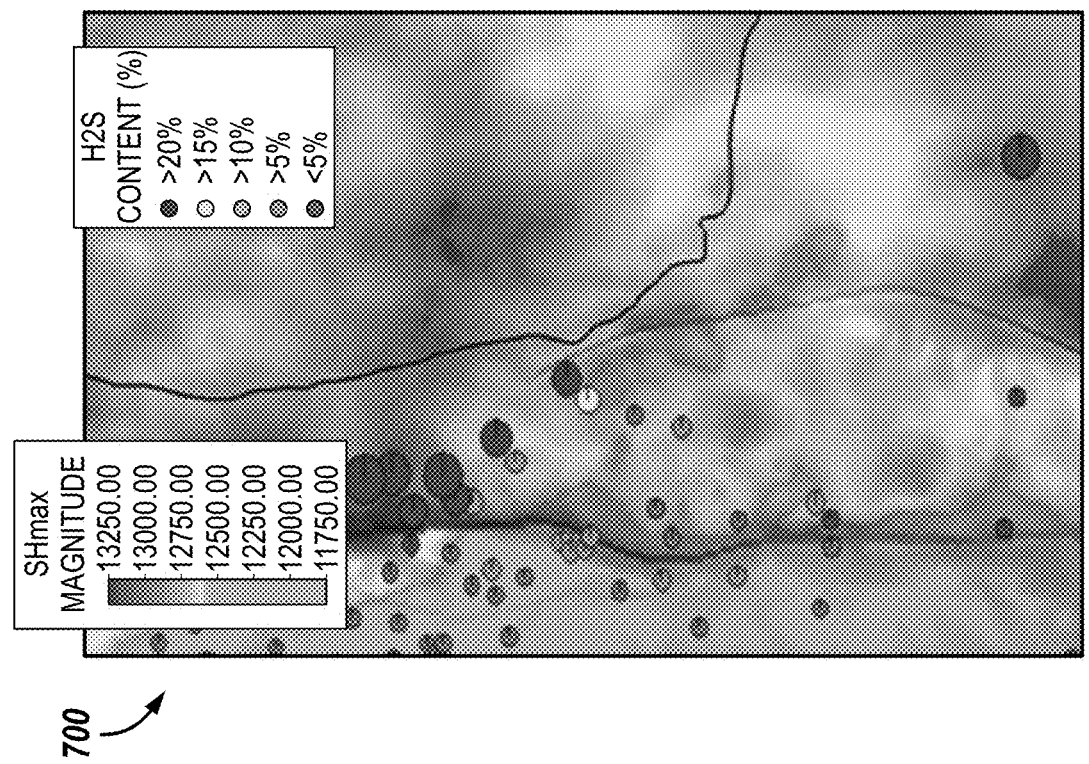
FIG. 7 is a map of hydrogen sulfide ($H_2S$) concentration and maximum horizontal stress magnitude in an area of interest in accordance with an embodiment of the disclosure.

Using the stress ratio, the mechanical earth model and hydrogen sulfide ($H_2S$) concentration may be correlated, as the stress model and stress ratio relate to temperature variations, mechanical properties, rock quality, tectonic deformation, and reservoir compaction. In some embodiments, hydrogen sulfide ($H_2S$) concentration may be compared with maximum horizontal stress ($S_{Hmax}$), the minimum horizontal stress ($S_{hmin}$), and the stress ratio for a strike slip regime environment. FIG. 7 depicts a map 700 of hydrogen sulfide ($H_2S$) concentration and maximum horizontal stress magnitude in an area of interest in accordance with an embodiment of the disclosure. As shown in FIG. 7, the greater hydrogen sulfide ($H_2S$) concentration corresponds to those areas of greater maximum horizontal stress ($S_{Hmax}$).

Figure 8:
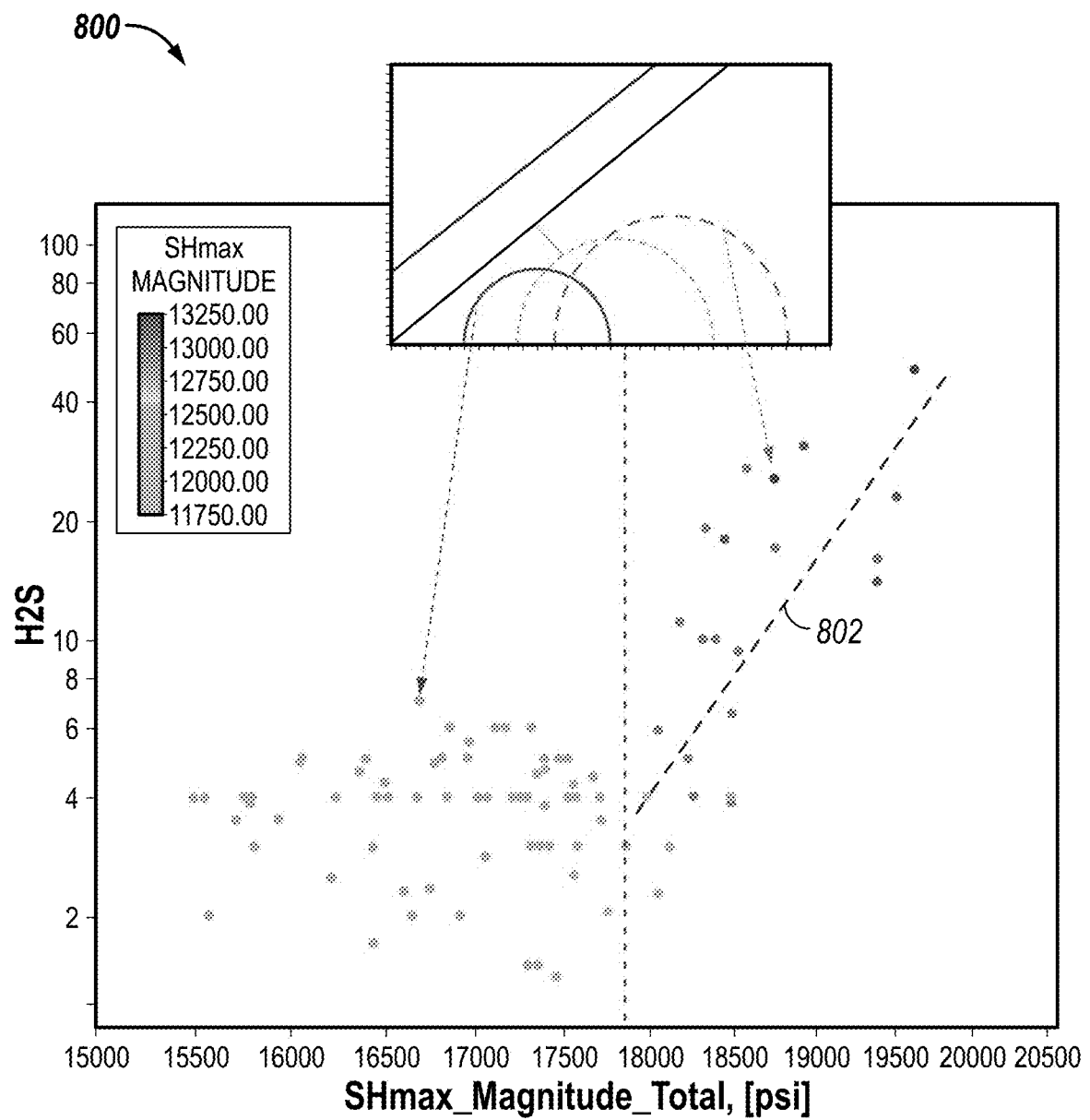
FIG. 8 is a plot of hydrogen sulfide ($H_2S$) concentration vs. maximum horizontal stress magnitude in accordance with an embodiment of the disclosure.

Stress magnitude and stress ratio control the major deformation within an area of interest; and, as shown in FIG. 8, a correlation may be generated between, for example, hydrogen sulfide ($H_2S$) concentration and maximum horizontal stress ($S_{Hmax}$). In some embodiments, a correlation may be generated between hydrogen sulfide ($H_2S$) concentration, maximum horizontal stress ($S_{Hmax}$), and stress ratio.

In some embodiments, the correlation may be restricted to stress magnitudes greater than 17,500 pounds-per-square inch (psi). Above, 17,500 psi, the stress ratio between the maximum horizontal stress ($S_{Hmax}$) and the minimum horizontal stress ($S_{hmin}$) increases significantly. FIG. 8 is a plot 800 of hydrogen sulfide ($H_2S$) concentration vs. maximum horizontal stress ($S_{Hmax}$) magnitude in accordance with an embodiment of the disclosure. FIG. 8 further shows a correlation 802 between the hydrogen sulfide ($H_2S$) concentration and maximum horizontal stress ($S_{Hmax}$) magnitude for stresses greater than 17,500 psi. In some embodiments, the correlation may be represented by Equation (2)

$$H_2S \text{ concentration} = 2 \times 10^{-102} * (S_{Hmax})^{24.068} \quad (3)$$

Figure 9:
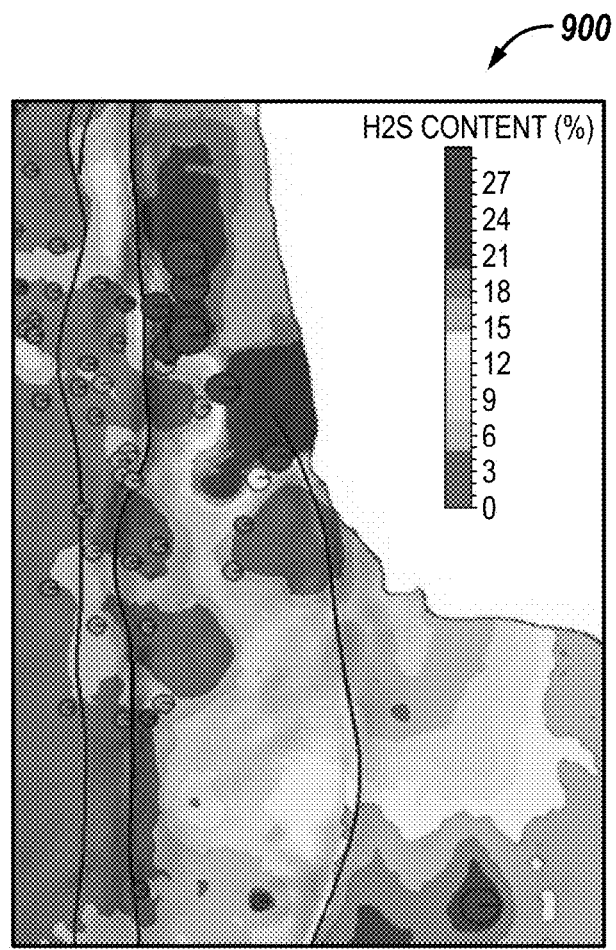
FIG. 9 is a plot of hydrogen sulfide ($H_2S$) concentration vs. maximum horizontal stress ($S_{Hmax}$) magnitude in accordance with an embodiment of the disclosure.

In some embodiments, the correlation between hydrogen sulfide ($H_2S$) concentration, maximum horizontal stress ($S_{Hmax}$), and stress ratio may be applied to the 3D grid block model of the mechanical earth model to produce a hydrogen sulfide ($H_2S$) concentration map. FIG. 9 depicts a hydrogen sulfide ($H_2S$) concentration map 900 with color-coded hydrogen sulfide ($H_2S$) concentrations in accordance with an embodiment of the disclosure. In some embodiments, the hydrogen sulfide ($H_2S$) concentration map may be used for field development, reserves calculation, or other operations.

Figure 10:
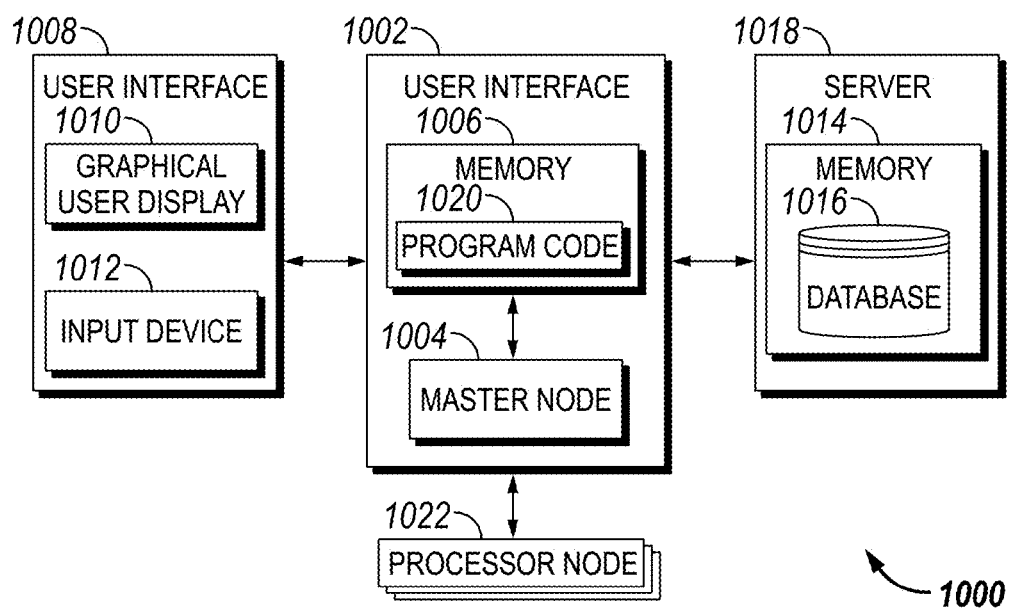
FIG. 10 is a block diagram of a data processing system in accordance with an embodiment of the disclosure.

FIG. 10 depicts a data processing system 1000 that includes a computer 1002 having a master node processor 1004 and memory 1006 coupled to the processor 1004 to store operating instructions, control information and database records therein. The data processing system 1000 may be a multicore processor with nodes such as those from Intel Corporation or Advanced Micro Devices (AMD), or an HPC Linux cluster computer. The data processing system 1000 may also be a mainframe computer of any conventional type of suitable processing capacity such as those available from International Business Machines (IBM) of Armonk, N.Y. or other source. The data processing system 1000 may in cases also be a computer of any conventional type of suitable processing capacity, such as a personal computer, laptop computer, or any other suitable processing apparatus. It should thus be understood that a number of commercially available data processing systems and types of computers may be used for this purpose The computer 1002 is accessible to operators or users through user interface 1008 and are available for displaying output data or records of processing results obtained according to the present disclosure with an output graphic user display 1010. The output display 1010 includes components such as a printer and an output display screen capable of providing printed output information or visible displays in the form of graphs, data sheets, graphical images, data plots and the like as output records or images.

The user interface 1008 of computer 1002 also includes a suitable user input device or input/output control unit 1012 to provide a user access to control or access information and database records and operate the computer 1002. Data processing system 1000 further includes a database of data stored in computer memory, which may be internal memory 1006, or an external, networked, or non-networked memory as indicated at 1014 in an associated database 1016 in a server 1018.

The data processing system 1000 includes executable code 1020 stored in non-transitory memory 1006 of the computer 1002. The executable code 1020 according to the present disclosure is in the form of computer operable instructions causing the data processor 1004 to implement the process 200 and determine maximum horizontal stress, minimum horizontal stress, stress ratio, and hydrogen sulfide ($H_2S$) concentration and distribution according to the present disclosure in the manner set forth.

It should be noted that executable code 1020 may be in the form of microcode, programs, routines, or symbolic computer operable languages capable of providing a specific set of ordered operations controlling the functioning of the data processing system 1000 and direct its operation. The instructions of executable code 1020 may be stored in memory 1006 of the data processing system 1000, or on computer diskette, magnetic tape, conventional hard disk drive, electronic read-only memory, optical storage device, or other appropriate data storage device having a non-transitory computer readable storage medium stored thereon. Executable code 1020 may also be contained on a data storage device such as server 1018 as a non-transitory computer readable storage medium, as shown.

The data processing system 1000 may include a single CPU, or a computer cluster as shown in FIG. 10, including computer memory and other hardware to make it possible to manipulate data and obtain output data from input data. A cluster is a collection of computers, referred to as nodes, connected via a network. Usually a cluster has one or two head nodes or master nodes 1004 used to synchronize the activities of the other nodes, referred to as processing nodes 1022. The processing nodes 1022 each execute the same computer program and work independently on different segments of the grid which represents the reservoir.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method for determining hydrogen sulfide ($H_2S$) concentration in a carbonate reservoir, the method comprising:

obtaining a plurality of measurements from one or more wells accessing the carbonate reservoir;

determining a plurality of hydrogen sulfide ($H_2S$) concentration values from the plurality of measurements;

determining a plurality of maximum horizontal stress values, the plurality of maximum horizontal stress values determined from reservoir parameters representing properties of the carbonate reservoir;

correlating the plurality of hydrogen sulfide ($H_2S$) concentration values with the plurality of maximum horizontal stress values; and determining a concentration of hydrogen sulfide ($H_2S$) at a depth in the carbonate reservoir using the correlation.

2. The method of claim 1, comprising:

determining a plurality of stress ratio values, the stress ratio comprising a ratio of the maximum horizontal stress to the minimum horizontal stress; and correlating the plurality of hydrogen sulfide ($H_2S$) concentration values with the plurality of stress ratio values.

3. The method of claim 1, wherein correlating the plurality of hydrogen sulfide ($H_2S$) concentration values with the plurality of maximum horizontal stress values comprises correlating the plurality of hydrogen sulfide ($H_2S$) concentration values to the plurality of maximum horizontal stress values for maximum horizontal stress values greater than 17,500 psi.

4. The method of claim 1, wherein the reservoir parameters representing properties of the carbonate reservoir comprise dynamic mechanical properties of the rock in the subsurface geological structure.

5. The method of claim 1, wherein the reservoir parameters representing properties of the carbonate reservoir comprise static mechanical properties of the rock in the subsurface geological structure.

6. The method of claim 1, wherein obtaining a plurality of measurements from one or more wells accessing the carbonate reservoir comprises obtaining bulk density logs and acoustic sonic logs.

7. The method of claim 1, comprising generating a hydrogen sulfide ($H_2S$) concentration map, the hydrogen sulfide ($H_2S$) concentration map comprising a map of hydrogen sulfide ($H_2S$) concentration values for a model of the carbonate reservoir.

8. A non-transitory computer-readable storage medium having executable code stored thereon for determining hydrogen sulfide ($H_2S$) concentration in a carbonate reservoir, the executable code comprising a set of instructions that causes a processor to perform operations comprising:

obtaining a plurality of measurements from one or more wells accessing the carbonate reservoir;

determining a plurality of hydrogen sulfide ($H_2S$) concentration values from the plurality of measurements;

determining a plurality of maximum horizontal stress values, the plurality of maximum horizontal stress values determined from reservoir parameters representing properties of the carbonate reservoir;

correlating the plurality of hydrogen sulfide ($H_2S$) concentration values with the plurality of maximum horizontal stress values; and determining a concentration of hydrogen sulfide ($H_2S$) at a depth in the carbonate reservoir using the correlation.

9. The non-transitory computer-readable storage medium of claim 8, wherein the operations comprise:

determining a plurality of stress ratio values, the stress ratio comprising a ratio of the maximum horizontal stress to the minimum horizontal stress; and correlating the plurality of hydrogen sulfide ($H_2S$) concentration values with the plurality of stress ratio values.

10. The non-transitory computer-readable storage medium of claim 8, wherein correlating the plurality of hydrogen sulfide ($H_2S$) concentration values with the plurality of maximum horizontal stress values comprises correlating the plurality of hydrogen sulfide ($H_2S$) concentration values to the plurality of maximum horizontal stress values for maximum horizontal stress values greater than 17,500 psi.

11. The non-transitory computer-readable storage medium of claim 8, wherein the reservoir parameters representing properties of the carbonate reservoir comprise dynamic mechanical properties of the rock in the subsurface geological structure.

12. The non-transitory computer-readable storage medium of claim 8, wherein the reservoir parameters representing properties of the carbonate reservoir comprise static mechanical properties of the rock in the subsurface geological structure.

13. The non-transitory computer-readable storage medium of claim 8, wherein obtaining a plurality of measurements from one or more wells accessing the carbonate reservoir comprises obtaining bulk density logs and acoustic sonic logs.

14. The non-transitory computer-readable storage medium of claim 8, wherein the operations comprise generating a hydrogen sulfide ($H_2S$) concentration map, the hydrogen sulfide ($H_2S$) concentration map comprising a map of hydrogen sulfide ($H_2S$) concentration values for a model of the carbonate reservoir.

15. A system for determining hydrogen sulfide ($H_2S$) concentration in a carbonate reservoir, comprising:

a processor;

a non-transitory computer-readable memory accessible by the processor and having executable code stored thereon, the executable code comprising a set of instructions that causes a processor to perform operations comprising:

obtaining a plurality of measurements from one or more wells accessing the carbonate reservoir;

determining a plurality of hydrogen sulfide ($H_2S$) concentration values from the plurality of measurements;

determining a plurality of maximum horizontal stress values, the plurality of maximum horizontal stress values determined from reservoir parameters representing properties of the carbonate reservoir;

correlating the plurality of hydrogen sulfide ($H_2S$) concentration values with the plurality of maximum horizontal stress values; and determining a concentration of hydrogen sulfide ($H_2S$) at a depth in the carbonate reservoir using the correlation.

16. The system of claim 15, wherein the operations comprise:

determining a plurality of stress ratio values, the stress ratio comprising a ratio of the maximum horizontal stress to the minimum horizontal stress; and correlating the plurality of hydrogen sulfide ($H_2S$) concentration values with the plurality of stress ratio values.

17. The system of claim 15, wherein correlating the plurality of hydrogen sulfide ($H_2S$) concentration values with the plurality of maximum horizontal stress values comprises correlating the plurality of hydrogen sulfide ($H_2S$) concentration values to the plurality of maximum horizontal stress values for maximum horizontal stress values greater than 17,500 psi.

18. The system of claim 15, wherein the reservoir parameters representing properties of the carbonate reservoir comprise dynamic mechanical properties of the rock in the subsurface geological structure.

19. The system of claim 15, wherein the reservoir parameters representing properties of the carbonate reservoir comprise static mechanical properties of the rock in the subsurface geological structure.

20. The system of claim 15, wherein obtaining a plurality of measurements from one or more wells accessing the carbonate reservoir comprises obtaining bulk density logs and acoustic sonic logs.

* * * * *